(12) United States Patent
Trombetta

(10) Patent No.: US 12,415,430 B2
(45) Date of Patent: Sep. 16, 2025

(54) BATTERY CHARGING SYSTEM FOR ELECTRIFIED VEHICLE INCLUDING INTERFACE FOR CABLE AND HOUSING

(71) Applicant: Ford Global Technologies, LLC, Dearborn, MI (US)

(72) Inventor: Christopher Bernard Trombetta, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 528 days.

(21) Appl. No.: 17/958,517

(22) Filed: Oct. 3, 2022

(65) Prior Publication Data

US 2024/0109439 A1   Apr. 4, 2024

(51) Int. Cl.
*B60L 53/16*   (2019.01)
*B60L 53/18*   (2019.01)
*H01R 13/631*   (2006.01)
*H02J 7/00*   (2006.01)

(52) U.S. Cl.
CPC ............... *B60L 53/16* (2019.02); *B60L 53/18* (2019.02); *H01R 13/631* (2013.01); *H02J 7/0042* (2013.01); *H01R 2201/26* (2013.01)

(58) Field of Classification Search
CPC ....... B60L 53/16; B60L 53/18; H01R 13/631; H01R 2201/26; H01R 24/00; H01R 13/502; H01R 13/52; H01R 31/06; H02J 7/0042; Y02T 10/70; Y02T 10/7072; Y02T 90/14

See application file for complete search history.

(56) References Cited

U.S. PATENT DOCUMENTS

| | | | |
|---|---|---|---|
| 8,929,069 B2 | 1/2015 | Muller et al. | |
| 9,876,317 B2 * | 1/2018 | Glick | B60L 53/16 |
| 10,308,131 B1 * | 6/2019 | Bartlett | B60L 53/16 |
| 2012/0025942 A1 * | 2/2012 | Bhat | H01F 38/14 |
| | | | 307/104 |
| 2012/0129369 A1 | 5/2012 | Bogart et al. | |
| 2014/0035527 A1 * | 2/2014 | Hayashigawa | B60L 3/04 |
| | | | 320/109 |
| 2015/0035483 A1 | 2/2015 | Mueller et al. | |
| 2018/0022228 A1 * | 1/2018 | Mazaira | B60L 53/64 |
| | | | 320/109 |
| 2019/0111793 A1 * | 4/2019 | Christen | B60L 53/14 |
| 2019/0118662 A1 * | 4/2019 | Anzicek | B60L 53/14 |
| 2019/0277067 A1 * | 9/2019 | Sureshkumar | B60L 53/60 |
| 2021/0291674 A1 * | 9/2021 | Bell | B60L 50/66 |
| 2022/0144111 A1 | 5/2022 | Logakis et al. | |
| 2024/0109439 A1 * | 4/2024 | Trombetta | H01R 13/631 |

FOREIGN PATENT DOCUMENTS

DE   102013007330 A1   10/2014

* cited by examiner

*Primary Examiner* — Abdullah A Riyami
*Assistant Examiner* — Nader J Alhawamdeh
(74) *Attorney, Agent, or Firm* — David B. Kelley; Carlson, Gaskey & Olds, P.C.

(57) ABSTRACT

This disclosure relates to a battery charging system for an electrified vehicle, and in particular relates to an interface for a cable and a housing. The charging system includes a housing, a first cable including a plug configured to couple to a charging port of the electrified vehicle, and a second cable including a first plug configured to couple to an electrical outlet and a second plug configured to couple to a socket of the housing. Further, the housing includes a projection surrounding the socket and projecting beyond an adjacent exterior surface of the housing.

20 Claims, 3 Drawing Sheets

BATTERY CHARGING SYSTEM FOR ELECTRIFIED VEHICLE INCLUDING INTERFACE FOR CABLE AND HOUSING

TECHNICAL FIELD

This disclosure relates to a battery charging system for an electrified vehicle, and in particular relates to an interface for a cable and a housing.

BACKGROUND

The desire to reduce automotive fuel consumption and emissions has been well documented. Therefore, electrified vehicles are being developed that reduce or completely eliminate reliance on internal combustion engines. In general, electrified vehicles differ from conventional motor vehicles because they are selectively driven by one or more battery powered electric machines. Conventional motor vehicles, by contrast, rely exclusively on the internal combustion engine to propel the vehicle.

A charging system connects an electrified vehicle to an external power source, such as a wall outlet or a charging station, for charging the energy storage devices (e.g., battery cells) of the electrified vehicle traction battery pack. Many charging systems utilize electric vehicle supply equipment (EVSE) for transferring electric power from the external power source to the vehicle for charging the battery pack through a connector that plugs into a charge port of a vehicle inlet assembly

SUMMARY

In some aspects, the techniques described herein relate to a charging system for an electrified vehicle, including: a housing; a first cable including a plug configured to couple to a charging port of the electrified vehicle; and a second cable including a first plug configured to couple to an electrical outlet and a second plug configured to couple to a socket of the housing, wherein the housing includes a projection surrounding the socket and projecting beyond an adjacent exterior surface of the housing.

In some aspects, the techniques described herein relate to a charging system, wherein the projection of the housing exhibits a height within a range of 3 mm to 8 mm.

In some aspects, the techniques described herein relate to a charging system, wherein the projection of the housing exhibits a width within a range of 1.5 mm to 3 mm.

In some aspects, the techniques described herein relate to a charging system, wherein the projection of the housing is free of barbs and ribs.

In some aspects, the techniques described herein relate to a charging system, wherein the projection of the housing continuously extends about an entire perimeter of the socket.

In some aspects, the techniques described herein relate to a charging system, wherein the second plug includes a projection establishing a recess configured to receive the projection of the housing when the second plug is coupled to the socket.

In some aspects, the techniques described herein relate to a charging system, wherein the projection of the second plug extends about an entire perimeter of the second plug.

In some aspects, the techniques described herein relate to a charging system, wherein the surfaces of the second plug providing the recess are free of any barbs and ribs.

In some aspects, the techniques described herein relate to a charging system, wherein the projection of the second plug includes a first segment projecting outward from a side of the second plug and a second segment projecting substantially perpendicularly from the first segment.

In some aspects, the techniques described herein relate to a charging system, wherein a surface of the first segment is inclined at a non-zero angle relative to a line perpendicular to a central axis of the second plug, wherein the angle is measured from the line and moving toward the second segment.

In some aspects, the techniques described herein relate to a charging system, wherein the angle is within a range of 15°-60°.

In some aspects, the techniques described herein relate to a charging system, wherein the angle is about 45°.

In some aspects, the techniques described herein relate to a charging system, wherein a free end of the second segment directly abuts the exterior surface of the housing when the second plug is coupled to the socket.

In some aspects, the techniques described herein relate to a charging system, wherein the second plug is configured to connect to a 120 V outlet.

In some aspects, the techniques described herein relate to a charging system, wherein the second plug is configured to connect to a 240 V outlet.

In some aspects, the techniques described herein relate to a charging system, wherein the first cable is integrally formed with the housing.

In some aspects, the techniques described herein relate to a charging system, wherein the second cable is configured to couple to an opposite side of the housing as the first cable.

In some aspects, the techniques described herein relate to a charging system, wherein the housing is mounted to a wall such that the socket is oriented in an upward direction.

In some aspects, the techniques described herein relate to a charging system, wherein the projection projects above the adjacent exterior surface of the housing.

In some aspects, the techniques described herein relate to a charging system for an electrified vehicle, including: a housing including a socket and a projection, wherein the projection of the housing continuously extends about and surrounds an entire perimeter of the socket, wherein the projection of the housing projects beyond an adjacent exterior surface of the housing, wherein the projection of the housing is free of barbs and ribs; a first cable including a plug configured to couple to a charging port of the electrified vehicle; and a second cable including a first plug configured to couple to an electrical outlet and a second plug configured to couple to a socket of the housing, wherein the second plug includes a projection establishing a recess configured to receive the projection of the housing when the second plug is coupled to the socket, wherein the projection of the second plug extends about an entire perimeter of the second plug, wherein the surfaces of the second plug providing the recess are free of any barbs and ribs, wherein the projection of the second plug includes a first segment projecting outward from a side of the second plug and a second segment projecting substantially perpendicular to the first segment, wherein a surface of the first segment is inclined at a non-zero angle relative to a line perpendicular to a central axis of the second plug, wherein the angle is measured from the line and moving toward the second segment, wherein the second cable is configured to couple to an opposite side of the housing as the first cable, and wherein the wherein the first plug is configured to connect to a 120 V or 240 V outlet.

DETAILED DESCRIPTION

This disclosure relates to a battery charging system for an electrified vehicle, and in particular relates to an interface for a cable and a housing. Among other benefits, the charging system is configured to resist ingress of moisture, humidity, and/or other forms of water relative to a housing of the charging system.

Figure 1:
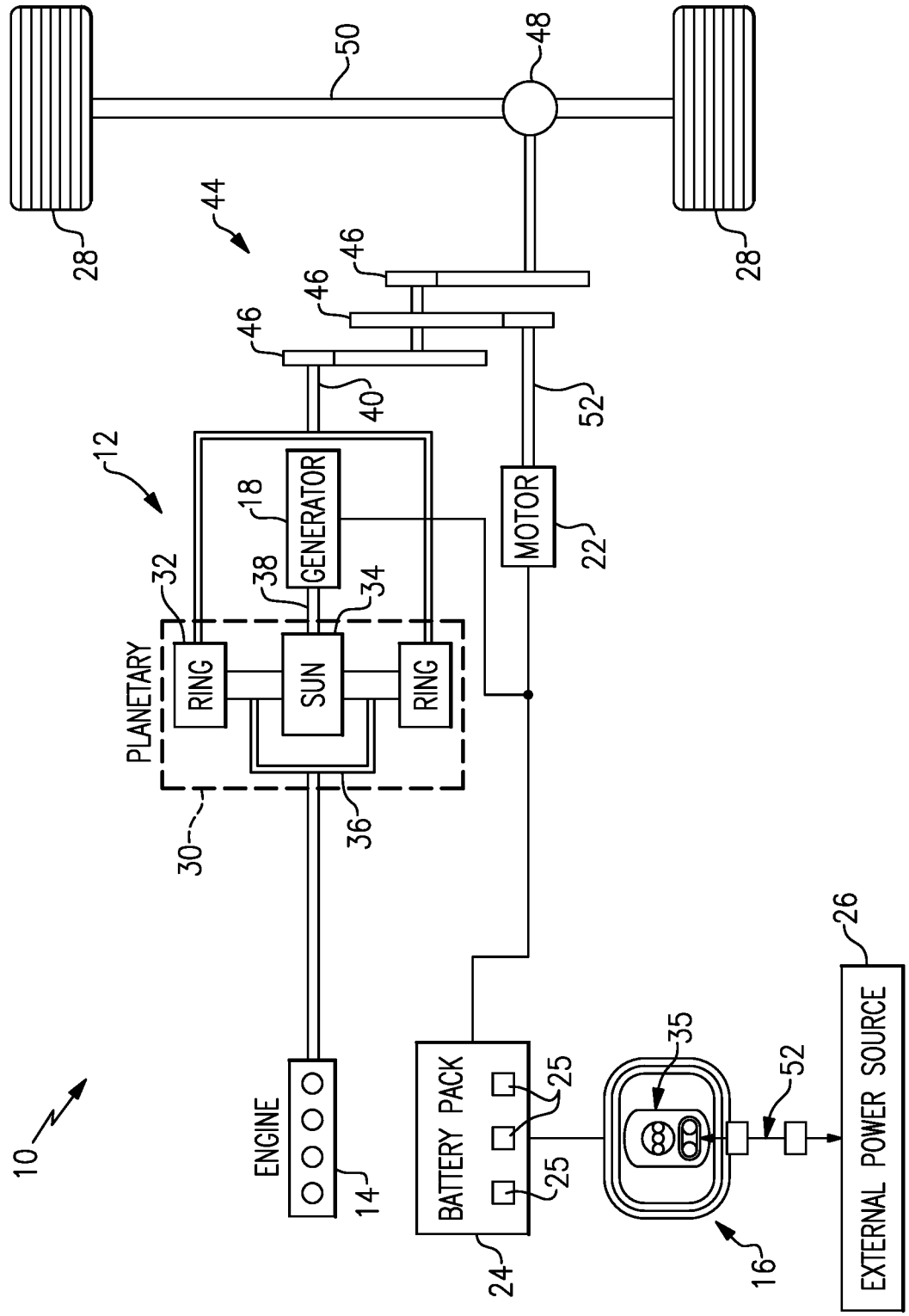
FIG. 1 schematically illustrates a powertrain of an electrified vehicle.

FIG. 1 schematically illustrates a powertrain 10 for an electrified vehicle 12. In an embodiment, the electrified vehicle 12 is a plug-in hybrid electric vehicle (PHEV). In another embodiment, the electrified vehicle is a battery electric vehicle (BEV).

In an embodiment, the powertrain 10 is a power-split powertrain system that employs a first drive system and a second drive system. The first drive system may include a combination of an engine 14 and a generator 18 (i.e., a first electric machine). The second drive system includes at least a motor 22 (i.e., a second electric machine) and a battery pack 24. In this example, the second drive system is considered an electric drive system of the powertrain 10. The first and second drive systems generate torque to drive one or more sets of vehicle drive wheels 28 of the electrified vehicle 12.

The engine 14, which in an embodiment is an internal combustion engine, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 50 through the differential 48 to distribute torque to the vehicle drive wheels 28. In one embodiment, the power transfer units 30, 44 are part of a transaxle 20 of the electrified vehicle 12.

The motor 22 can also be employed to drive the vehicle drive wheels 28 by outputting torque to a shaft 55 that is also connected to the second power transfer unit 44. In one embodiment, the motor 22 is part of a regenerative braking system. For example, the motor 22 can each output electrical power to the battery pack 24.

The battery pack 24 is an exemplary electrified vehicle battery. The battery pack 24 may be a high voltage traction battery pack that includes a plurality of battery assemblies 25 (i.e., battery arrays or groupings of battery cells) capable of outputting electrical power to operate the motor 22, the generator 18, and/or other electrical loads of the electrified vehicle 12. Other types of energy storage devices and/or output devices can also be used to electrically power the electrified vehicle 12.

The electrified vehicle 12 may employ two basic operating modes. The electrified vehicle 12 may operate in an Electric Vehicle (EV) mode where the motor 22 is used (generally without assistance from the engine 14) for vehicle propulsion, thereby depleting the battery pack 24 state of charge up to its maximum allowable discharging rate under certain driving patterns/cycles. The EV mode is an example of a charge depleting mode of operation for the electrified vehicle 12. During EV mode, the state of charge of the battery pack 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery pack 24 at a constant or approximately constant level by increasing the engine 14 propulsion. The electrified vehicle 12 may be operated in other operating modes in addition to the EV and HEV modes within the scope of this disclosure.

The electrified vehicle 12 is also equipped with a charging system 16 for charging the energy storage devices (e.g., battery cells) of the battery pack 24. The charging system 16 may include charging components that are located both onboard the electrified vehicle 12 and external to the electrified vehicle 12. The charging system 16 is connectable to one or more external power sources 26 (e.g., utility/grid power from an electrical grid) for receiving and distributing power throughout the electrified vehicle 12.

In an embodiment, the charging system 16 includes a vehicle inlet assembly 35 (sometimes referred to as a charge port assembly or a charging port) located on-board the electrified vehicle 12, and an electric vehicle supply equipment (EVSE) assembly 52 that can be operably connected between the vehicle inlet assembly 35 and the external power source 26. The vehicle inlet assembly 35 may include one or more ports adapted to receive a connector (sometimes referred to as a coupler or plug) of the EVSE assembly 52. The vehicle inlet assembly 35 is therefore configured to receive power from the external power source 26 and then supply the power to the battery pack 24 for charging the battery cells contained therein.

The charging system 16 may be equipped with power electronics for converting AC power received from the external power source 26 to DC power for charging the energy storage devices of the battery pack 24. The charging system 16 is also configured to accommodate one or more conventional voltage sources from the external power source 26 (e.g., 110 volt, 220 volt, etc.). The charging system 16 may be configured to provide any level of charging (e.g., level 1, 2, DC, etc.).

The powertrain 10 of FIG. 1 is highly schematic and is not intended to limit this disclosure. Various additional components could alternatively or additionally be employed by the powertrain 10 within the scope of this disclosure.

Figure 2:
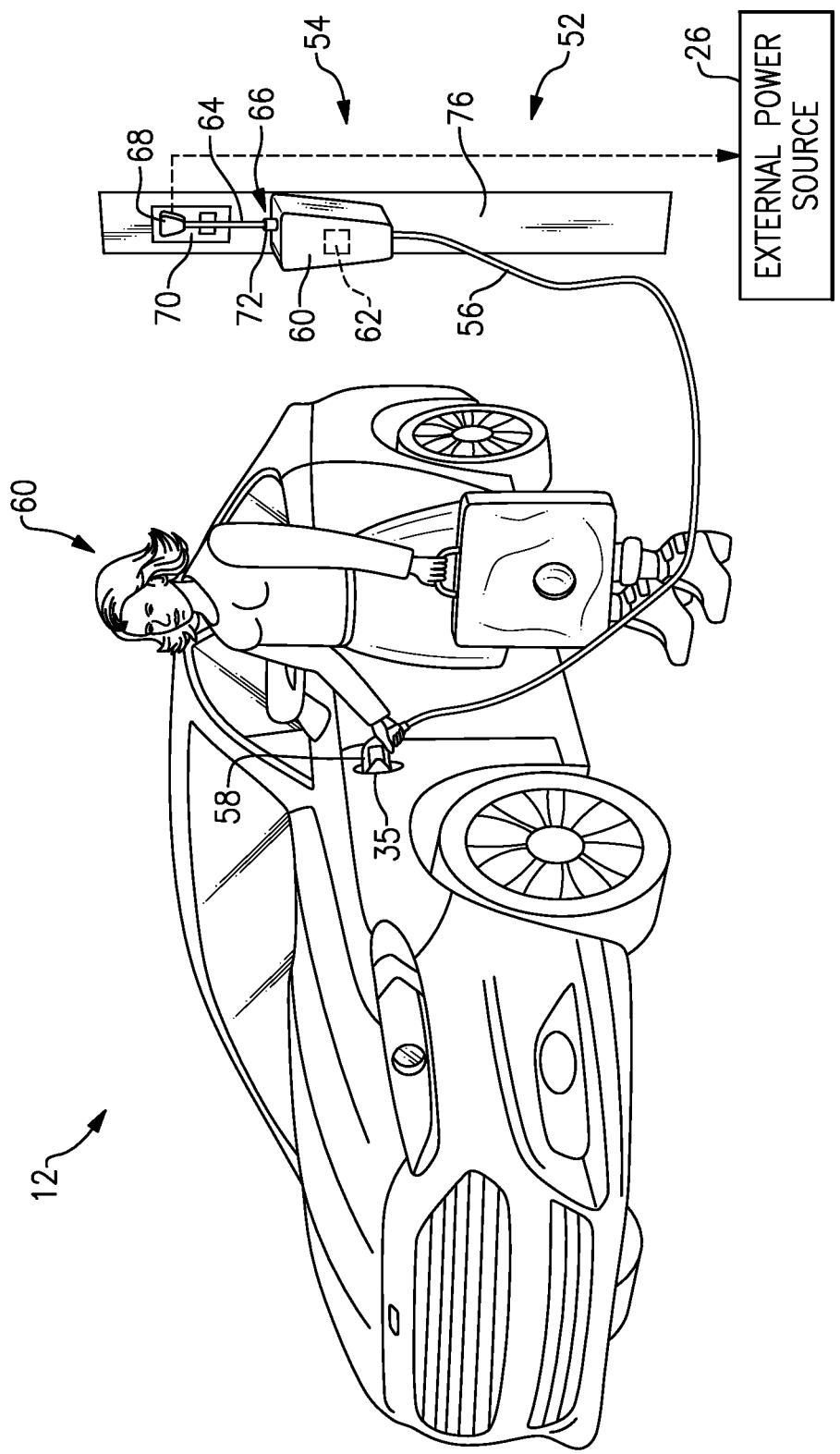
FIG. 2 schematically illustrates an electrified vehicle while being charged at a charging station.

FIG. 2 schematically illustrates an electrified vehicle 12 parked near a charging station 54 for charging. The electrified vehicle 12 may employ the powertrain 10 of FIG. 1, or any other electrified powertrain in which electric drive components are configured to electrically propel the wheels of the electrified vehicle 12, either with or without the assistance of an engine.

The charging station 54 is powered by the external power source 26. In an embodiment, the external power source 26 includes utility grid power. In another embodiment, the external power source 26 includes an alternative energy source, such as solar power, wind power, etc. In yet another embodiment, the external power source 26 includes a combination of utility grid power and alternative energy sources.

The EVSE assembly 52 (or a connected cord set of the charging station 54) may be connected to both the charging station 54 (or a wall outlet) and the vehicle inlet assembly 35 for charging the electrified vehicle 12. In this example, the EVSE assembly 52 includes a housing 60 that contains various electronics including a charging circuit interrupting device (CCID) 62. A first cable 56 projects from a first end, which here is the bottom, of the housing 60. The first cable 56 leads to the connector 58 (sometimes referred to as a coupler or plug) for connecting to the vehicle inlet assembly 35 of the electrified vehicle 12. In an example, the first cable 56 is integrally formed with the housing 60, such as by overmolding, and is not configured for detachment in normal use.

The housing 60, in this example, is also connected to a second cable 64 via an interface 66 between the housing 60 and the second cable 64. The interface 66 includes a plug and socket connection, or coupling, which includes both a mechanical and electrical connection between the housing 60 and second cable 64. The second cable 64 includes a first plug 68 configured to connect to an electrical outlet, such as wall outlet 70, and a second plug 72 configured to connect to a corresponding socket 74 (FIG. 3) of the housing 60. The second cable 64 may be configured to connect to a 120 V wall outlet 70. In another example, the second cable 64 may be configured to connect to another type of outlet, including a 208 VAC, 230 VAC, or a 240 V wall outlet.

Power originating from the external power source 26 may be transferred to the wall outlet 70, through second cable 64, housing 60, first cable 56, the connector 58, and to the vehicle inlet assembly 35 for charging the battery pack 24 of the electrified vehicle 12. The power received by the vehicle inlet assembly 35 may be transferred to an on-board charger module and then over high voltage cables to the battery pack 24 for replenishing the energy of the battery cells housed within the battery pack 24.

The housing 60 is oriented such that the second cable 64 is configured to attach to an opposite side of the housing 60 as the first cable 56. In some residential settings, the housing 60 is mounted to a wall 76, such as a garage wall, such that the interface 66 is oriented vertically upwardly, such that the second cable 64 is attachable generally to the top of the housing 60 while the first cable 56 projects generally from the bottom of the housing 60. In this example, the interface 66 is configured to resist ingress of water, including moisture and/or humidity, into the housing 60.

Figure 3:
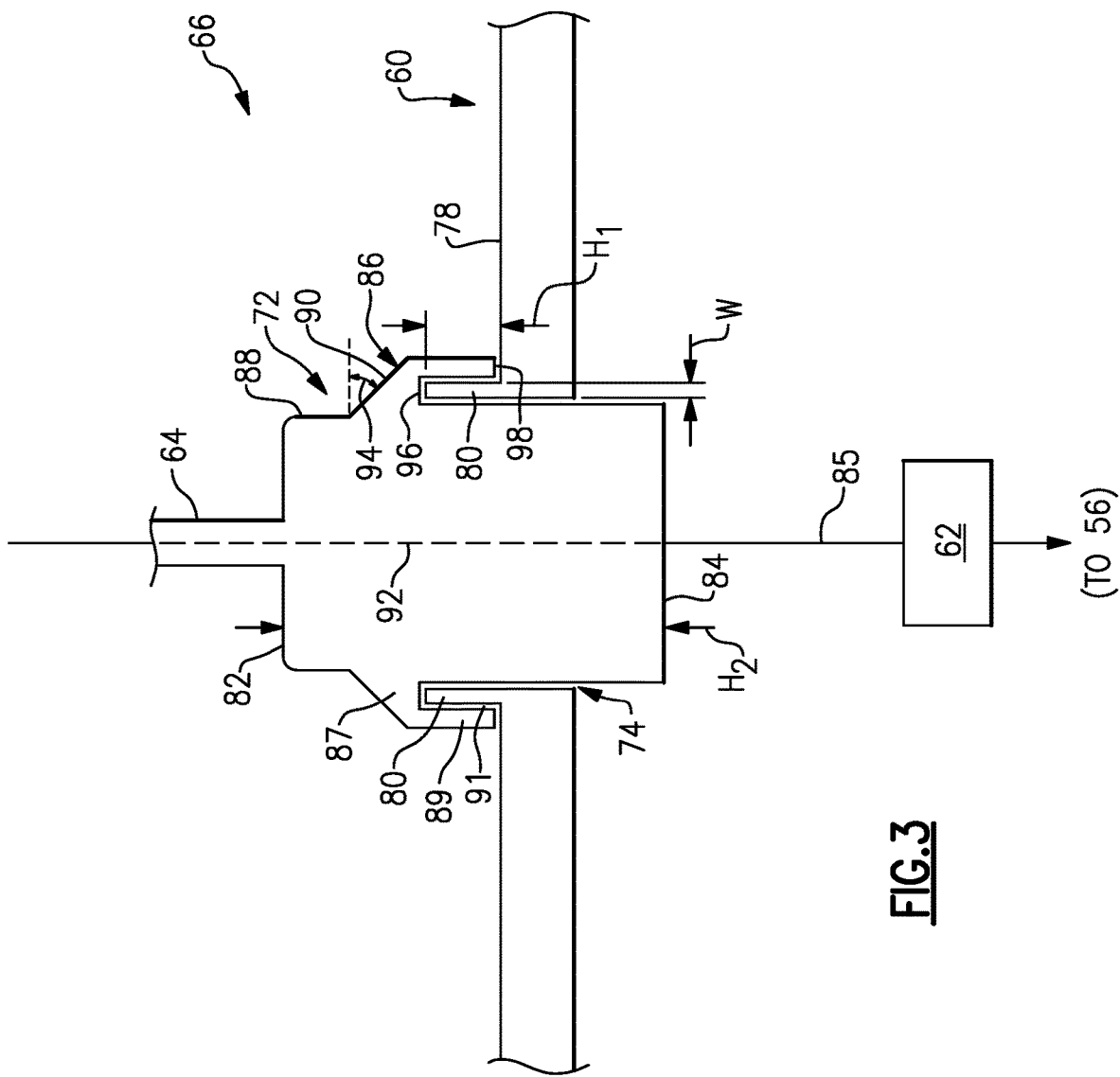
FIG. 3 is a close up view of a portion of the charging system, including an exemplary interface for a plug and housing.

With reference to FIG. 3, an example interface 66 is shown in more detail. In this example, an exterior surface 78 of the housing 60 exhibits a projection 80 projecting upward, away from the remainder of the exterior surface 78, and surrounding an entirety of a perimeter of an opening, or recess, in the housing 60 that provides the socket 74. In this example, adjacent the socket 74, the exterior surface 78 is substantially planar, and in a particular example the housing 60 is mounted relative to the wall 76 such that the exterior surface 78 is parallel to a ground surface, such as a garage floor.

In this example, the socket 74 is rectangular-shaped. In that example, the projection 80 is also rectangular-shaped, and exhibits four sides corresponding to the perimeter of the socket 74. The socket 74 could be other shapes, such as circular, ovular, etc., and the projection 80 would be formed to match those shapes to surround an entirety of the perimeter of the socket 74.

The projection 80 exhibits a height $H_1$ such that the projection 80 projects beyond, and in this example above, the exterior surface 78. The projection 80 also exhibits a width W. The height $H_1$ and width W are substantially uniform about the entirety of the perimeter of the socket 74. In an example, the height $H_1$ is within a range of 3 mm to 8 mm, and the width W is within a range of 1.5 mm to 3 mm. The height $H_1$ is such that water flowing along the exterior surface 78 is diverted from the socket 74, without being so high that the projection 80 is no longer sturdy. The width W is such that the projection 80 is sturdy yet does not use undue amounts of material.

In this example, the projection 80 is integrally formed with the exterior surface 78 to provide a single, integrally formed structure without any seams between the exterior surface 78 and the projection 80. Both the exterior surface 78 and the projection 80 may be made of a plastic material, in one example. In that example, the exterior surface 78 is integrally molded with the projection 80.

The second plug 72 exhibits a height $H_2$ between a first end 82 and a second end 84. Adjacent the first end 82, the second plug 72 is directly connected to the second cable 64. Adjacent the second end 84, the second plug 72 includes one or more electrical connectors, such as pins, and is configured to electrically connect the second cable 64 to the electronics inside housing 60, as represented schematically at 85.

The second plug 72 is formed by overmolding the electrical connectors within the second plug 72 relative to the exterior of the second cable 64. The exterior of the second plug 72 may be made of a polymer material. The entire exterior of the second plug 72 is an integrally formed structure without any seams in one example.

The exterior of the second plug 72 is configured to fit relative to the projection 80 when the second plug 72 is electrically and mechanically coupled to the housing 60, as shown in FIG. 3. In this example, the second plug 72 includes a projection 86 projecting outward and downward from a side 88 of the second plug 72. The terms "outward" and "downward" are used with reference to the orientation of the second plug 72 in FIG. 3. The projection 86 extends about the entire outer perimeter of the second plug 72 and exhibits substantially the same cross-sectional configuration about the entirety of the perimeter of the second plug 72.

The projection 86 includes a first segment 87 projecting generally outward from the side 88 and a second segment 89 projecting substantially perpendicular to the first segment, in a generally downward direction in FIG. 3, from the first segment 87 to form a recess 91 sized and shaped to receive the projection 80. The projection 80 and/or the projection 86 could include a gasket or seal at the interface of the projection 80 and the recess 91, however that is not required.

The first segment 87 includes an upper surface 90, which is inclined relative to a central axis 92 of the second plug 72 at an angle 94, measured from a line perpendicular to the central axis 92 and moving toward the second segment 89, which here is in the downward direction (again, relative to FIG. 3). The line, in this example, is shown as a dashed line and intersects a location where the upper surface 90 meets the side 88. The second plug 72 is symmetrical about the central axis 92, in this example. The angle 94 is non-zero in this example, such that the upper surface 90 is not flat, and thus directs water, humidity, and/or moisture away from the central axis 92, and in turn away from socket 74. The angle 94 may be within a range of 15°-60°, and in a specific example is about 45°. Providing the angle 94 within these ranges readily diverts water away from the socket 74.

The first segment 87 includes a lower surface 96 extending non-parallel to the upper surface 90, and in this particular example the lower surface 96 extends perpendicular to the central axis 92. The lower surface 96 exhibits a length, in the direction perpendicular to the central axis 92, slightly larger than the width W in this example.

The second segment 89 projects downward from the lower surface 96. The second segment 89 generally covers the projection 80 from an exterior perspective when the second plug 72 is coupled to the socket 74. In an example, the second segment 89 is sized such that a free end 98 of the second segment 89 directly abuts the exterior surface 78 when the second plug 72 is coupled to the socket 74. In other examples, there is a slight gap between free end 98 and the exterior surface 78 when the second plug 72 is coupled to the socket 74.

In an aspect of this disclosure, the projection 80 and the recess 91, including the corresponding structures of the second plug 72 that define the recess 91, namely the second segment 89, side 88, and lower surface 96, are smooth walls without any ribs or barbs, for example. In particular, in some examples, when coupled together, the second plug 72 and socket 74 are configured to produce an audible click sound to provide feedback to the user that the second plug 72 has been mechanically and electrically coupled to the socket 74. In order to eliminate the possibility of another audible click being produced, the projection 80 and the recess 91 are free of any ribs, barbs, or other structures that could potentially provide an audible click.

It should be understood that terms such as "about," "substantially," and "generally" are not intended to be boundaryless terms, and should be interpreted consistent with the way one skilled in the art would interpret those terms. It should also be understood that directional terms such as "upper," "top," "vertical," "forward," "downward," "rear," "side," "above," "below," etc., are used herein relative to the normal operational attitude of a vehicle for purposes of explanation only, and should not be deemed limiting.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A charging system for an electrified vehicle, comprising:
    a housing;
    a first cable including a plug configured to couple to a charging port of the electrified vehicle; and
    a second cable including a first plug configured to couple to an electrical outlet and a second plug configured to couple to a socket of the housing, wherein the housing includes a projection surrounding the socket and projecting beyond an adjacent exterior surface of the housing, wherein the socket is configured to facilitate a mechanical and electrical connection with the second plug, and wherein the second plug is configured for both attachment to the socket and detachment relative to the socket during the course of ordinary use.

2. The charging system as recited in claim 1, wherein the projection of the housing exhibits a height within a range of 3 mm to 8 mm.

3. The charging system as recited in claim 2, wherein the projection of the housing exhibits a width within a range of 1.5 mm to 3 mm.

4. The charging system as recited in claim 1, wherein the projection of the housing is free of barbs and ribs.

5. The charging system as recited in claim 1, wherein the projection of the housing continuously extends about an entire perimeter of the socket.

6. The charging system as recited in claim 1, wherein the second plug includes a projection establishing a recess configured to receive the projection of the housing when the second plug is coupled to the socket.

7. The charging system as recited in claim 6, wherein the projection of the second plug extends about an entire perimeter of the second plug.

8. The charging system as recited in claim 1, wherein the second plug is configured to connect to a 120 V outlet.

9. The charging system as recited in claim 1, wherein the second plug is configured to connect to a 240 V outlet.

10. The charging system as recited in claim 1, wherein the first cable is integrally formed with the housing.

11. The charging system as recited in claim 1, wherein the second cable is configured to couple to an opposite side of the housing as the first cable.

12. The charging system as recited in claim 11, wherein the housing is mounted to a wall such that the socket is oriented in an upward direction.

13. The charging system as recited in claim 12, wherein the projection projects above the adjacent exterior surface of the housing.

14. A charging system for an electrified vehicle, comprising:
    a housing:
    a first cable including a plug configured to couple to a charging port of the electrified vehicle: and
        a second cable including a first plug configured to couple to an electrical outlet and a second plug configured to couple to a socket of the housing, wherein the housing includes a projection surrounding the socket and projecting beyond an adjacent exterior surface of the housing,
        wherein the second plug includes a projection establishing a recess configured to receive the projection of the housing when the second plug is coupled to the socket, and wherein the surfaces of the second plug providing the recess are free of any barbs and ribs.

15. A charging system for an electrified vehicle, comprising:
a housing;
a first cable including a plug configured to couple to a charging port of the electrified vehicle; and
a second cable including a first plug configured to couple to an electrical outlet and a second plug configured to couple to a socket of the housing, wherein the housing includes a projection surrounding the socket and projecting beyond an adjacent exterior surface of the housing,
wherein the second plug includes a projection establishing a recess configured to receive the projection of the housing when the second plug is coupled to the socket, and
wherein the projection of the second plug includes a first segment projecting outward from a side of the second plug and a second segment projecting substantially perpendicularly from the first segment.

16. The charging system as recited in claim 15, wherein a surface of the first segment is inclined at a non-zero angle relative to a line perpendicular to a central axis of the second plug, wherein the angle is measured from the line and moving toward the second segment.

17. The charging system as recited in claim 16, wherein the angle is within a range of 15°-60°.

18. The charging system as recited in claim 17, wherein the angle is about 45°.

19. The charging system as recited in claim 15, wherein a free end of the second segment directly abuts the exterior surface of the housing when the second plug is coupled to the socket.

20. A charging system for an electrified vehicle, comprising:
a housing including a socket and a projection, wherein the projection of the housing continuously extends about and surrounds an entire perimeter of the socket, wherein the projection of the housing projects beyond an adjacent exterior surface of the housing, wherein the projection of the housing is free of barbs and ribs;
a first cable including a plug configured to couple to a charging port of the electrified vehicle; and
a second cable including a first plug configured to couple to an electrical outlet and a second plug configured to couple to a socket of the housing, wherein the second plug includes a projection establishing a recess configured to receive the projection of the housing when the second plug is coupled to the socket, wherein the projection of the second plug extends about an entire perimeter of the second plug, wherein the surfaces of the second plug providing the recess are free of any barbs and ribs, wherein the projection of the second plug includes a first segment projecting outward from a side of the second plug and a second segment projecting substantially perpendicular to the first segment, wherein a surface of the first segment is inclined at a non-zero angle relative to a line perpendicular to a central axis of the second plug, wherein the angle is measured from the line and moving toward the second segment, wherein the second cable is configured to couple to an opposite side of the housing as the first cable, and wherein the wherein the first plug is configured to connect to a 120 V or 240 V outlet.

* * * * *